A. F. HINTZE, DEC'D.
E. L. HINTZE, ADMINISTRATRIX.
GEARING FOR METERS.
APPLICATION FILED JAN. 18, 1909.
940,638.
Patented Nov. 16, 1909.
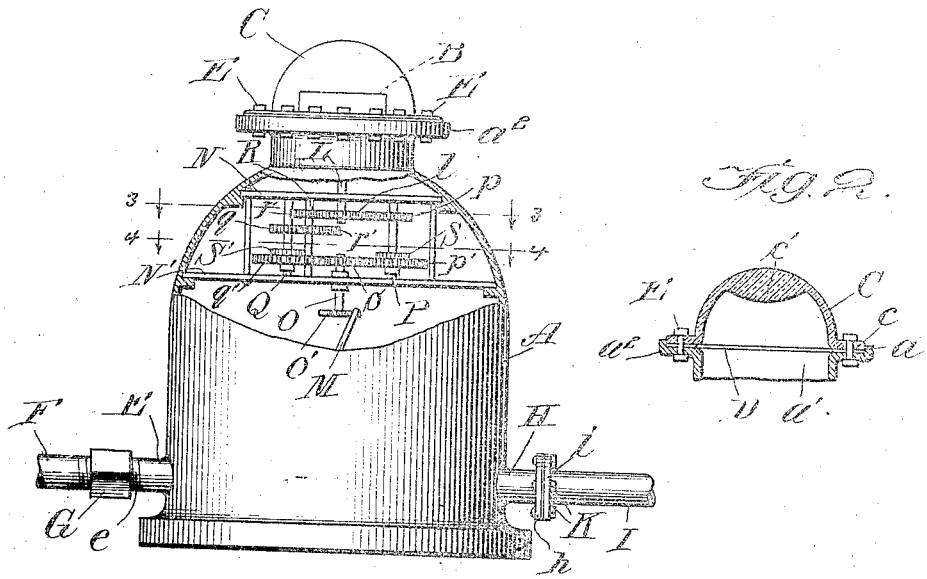
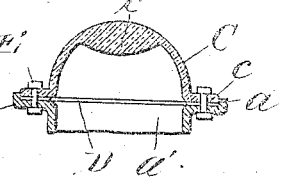
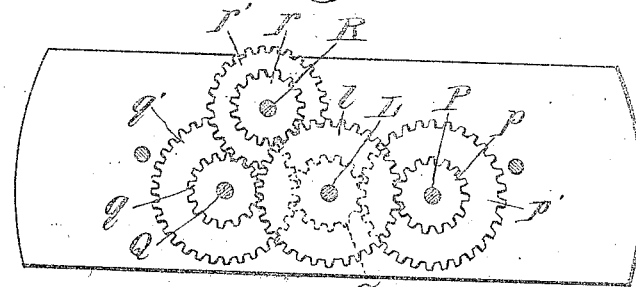
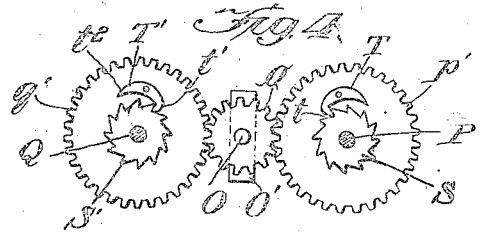
Witnesses:
Harry S. Gaither
Inventor:
Augustus F. Hintze
By Chamberlin & Freudenreich,
attys

UNITED STATES PATENT OFFICE.

AUGUSTUS F. HINTZE, OF CHICAGO, ILLINOIS; ETTA L. HINTZE ADMINISTRATRIX OF SAID AUGUSTUS F. HINTZE, DECEASED.

GEARING FOR METERS.

940,633.

Specification of Letters Patent.

Patented Nov. 16, 1909.

Application filed January 18, 1909. Serial No. 472,907.

*To all whom it may concern:*

Be it known that I, AUGUSTUS F. HINTZE, a citizen of the United States, residing at Chicago, county of Cook, State of Illinois, have invented a certain new and useful Improvement in Gearing for Meters, and declare the following to be a full, clear, and exact description of the same, such as will enable others skilled in the art to which it pertains to make and use the same, reference being had to the accompanying drawings, which form a part of this specification.

The present invention relates to meters, such as water and gas meters, and has for its object to improve their construction and to insure accurate registration of the fluid passing therethrough not only under the normal conditions for which they are intended, but also under any abnormal conditions to which they may be subjected either through accident or through an intent to defraud.

In many forms of meters the registering train and indicator are housed in such a manner that dirt can enter, making it difficult to obtain a reading and causing the reading which is obtained to be inaccurate because free movement of the mechanism is prevented by the dirt.

In accordance with my invention I so house the registering mechanism and indicator that it is impossible for dirt to enter and therefore, in one of its aspects my invention may be regarded as comprising a novel "dirt-proof" housing for these parts of meters. I prefer to make the housing of glass and to form a portion thereof into a lens which will magnify the indicator or indicators and make the reading thereof easier and at the same time insure its accuracy. In a further aspect, my invention may therefore be regarded as comprising a novel housing having a lens member through which the reading of a meter may be more readily effected than heretofore.

The usual type of meter will run either forward or backward, that is, it will operate regardless of the direction in which the fluid flows therethrough. However, the direction of movement of the registering mechanism depends upon the direction in which the fluid passes through the meter and, therefore, if a meter is connected in the reverse manner from that intended, the registering mechanism will run backward and cause the registered total to become continually smaller. This characteristic of meters occasions considerable annoyance and loss to venders of gas and water because a meter may be connected to run backward either accidentally or because of fraudulent intent, and furthermore, it sometimes happens that a consumer disconnects his meter and connects a force pump to the outlet side. It is evident that by working the pump vigorously for a short time a consumer can cut down the total reading of his meter materially without leaving any trace of his misconduct.

In accordance with a further feature of my invention I so construct meters that they cannot be connected in the wrong way accidentally or even intentionally without considerable trouble. My invention may therefore be regarded, in one of its aspects, as comprising means for preventing meters from being connected in any way except that intended. This expedient, while taking care of many causes through which meters have heretofore been made to read incorrectly will not, however, stop the man with the pump; and therefore, in accordance with a further feature of my invention, I so construct meters that they will always register positively the total amount of fluid which has passed therethrough regardless of the direction in which the passage occurs, adding to the amount which passes in one direction that which goes in the other. In its final aspect my invention may therefore be regarded as comprising a meter construction which causes the total amount of fluid to be registered regardless of the direction in which the fluid flows through the meter or the number of times the direction of flow is changed.

The various features of novelty whereby my invention is characterized will hereinafter be pointed out with particularity in the claims; but, for a full understanding of my invention and its various objects and advantages, reference may be had to the following detailed description taken in connection with the accompanying drawing, wherein:

Figure 1 is a view partly in side elevation and partly in section, showing my improvement. Fig. 2 is a section taken through the top of the casing and showing the form of and the means for securing the housing for the indicator; Fig. 3 is a section on line 3—3 of Fig. 1; and Fig. 4 is a section on line 4—4 of Fig. 1.

Referring to the drawing, A represents the main member of a meter casing of any usual form.

B is a registering mechanism or indicator from which readings are taken; this mechanism or indicator being also of any usual form and projecting through or being visible through the upper end of the main casing member.

C, is a glass dome-shaped housing mounted upon the member A and inclosing the registering mechanism or indicator. The member C is secured in place by an air-tight connection so that all dirt or grit are excluded, thereby enabling the registering mechanism to operate accurately and reliably. The joint is preferably made as follows: The upper face of the member A is provided with an annular recess or groove $a$ surrounding the opening $a^1$ and the dome or housing has an annular flange $c$ at its lower edge adapted to enter into the recess or groove. A seal D of some kind is preferably arranged between the dome and the main casing member, this seal being in the form of a compressible gasket; or, if desired, comprising a layer of cement which will not only act as a sealing means but will aid in securing the dome in place.

E are bolts passing through the flange of the dome and into the main casing member and drawing the dome firmly to its seat. Where the upper end of the main casing member terminates in a flange, as at $a^2$, the bolts may extend through both flanges. The top of the member C is preferably shaped so as to form a convex lens, as at $c'$. When the dials or other indicating devices of the meter are viewed through this lens-like top of the housing, they appear in magnified form so that readings may be made very easily and without danger of error.

In order to prevent the meter from being connected improperly so as to cause the fluid to flow therethrough in the reverse direction from that intended, I make the inlet and outlet connections different from each other. This may be accomplished in various ways, of course: a simple arrangement consisting in forming the inlet portion, E, of the casing with screw threads $e$ as is now customary, thereby permitting the inlet pipe F to be connected to the meter by a simple union G; and providing the outlet portion H of the casing with an annular flange $h$ to which the discharge pipe I may be connected by passing bolts K therethrough and through a similar flange $i$ on the pipe.

Accidental reversal of the meter connections will of course be avoided by making the inlet and outlet connections different from each other; but, in order to insure against a lowering of the totals indicated by the registering mechanism when the meter is wilfully reversed, I prefer to arrange the driving connection between the motor member of the meter and the member which gives the reading in such a manner that the latter member will always be driven in the same direction regardless of the direction in which the motor works.

In the arrangement shown in the drawing, L represents a shaft for driving the clockworks or other parts constituting the registering and indicating mechanism, and M is an arm or finger extending from any desired type of measuring device (not shown). Since the measuring device of itself forms no part of the present invention, the member M may be regarded as the motor.

N and $N^1$ are a pair of separated plates suitably supported within the meter in any suitable manner, the shaft L projecting downwardly through the upper of these plates N.

O is a shaft projecting through and journaled within the lower plate $N^1$. At the lower end of this latter shaft is an arm $O^1$ which is adapted to be engaged in the usual way by the motor member M so as to cause the shaft O to be rotated, step by step, when fluid is passing through the meter. Between the shafts L and O, I place two separate trains of gearing so arranged that they tend to rotate the shaft L in opposite directions upon rotation of the shaft O. Clutches are provided so that only one train at a time can follow its tendency, these clutches rendering one train operative when the shaft O revolves in one direction and bringing into play the other train when the shaft revolves in the opposite direction. Thus it will be seen that the driven shaft will always rotate in one direction, regardless of the direction of rotation of the driving shaft. The first and last gears of each train are a gear $l$ on the lower end of the shaft L and a gear $o$ on the upper end of the shaft O.

P is a shaft supported between and journaled in the plates N and $N^1$ and carrying a pair of gear wheels $p$ and $p^1$, which mesh respectively with the gear wheels $l$ and $o$. Q is a second shaft arranged between and journaled in the plates N and $N^1$ and this shaft carries gear wheels $q$ and $q^1$, the latter of which meshes with gear wheel $o$. R is a third shaft similar to and arranged in the same way as the shafts P and Q, the shaft R having thereon two gear wheels $r$ and $r^1$ which mesh respectively with the gear wheels $l$ and $q$. It will thus be seen that there are two trains of gears between the shafts L and O: one comprising the gear wheels $l$, $p$, $p^1$ and $o$; and the other comprising the gear wheels $l$, $r$, $r^1$, $q$, $q^1$ and $o$. It will be seen that by this arrangement a rotation of the driving shaft will result in a rotation of the driven shaft in either direction depending upon the train through which the connection is completed; and therefore by providing suitable clutches, a rotation of the driving shaft in either direction can be transformed into a rotation of the driven shaft in a single direction. It will also be seen that the number of elements in the gear trains may be varied within any desired limits as long as one less element is contained in one train than in the other.

The clutches may, of course take any suitable form in so far as the broader aspects of my invention are concerned; but I prefer to use an arrangement which is free from springs and which will operate positively in any position in which a meter may be placed. It is best to avoid springs since they will be corroded by the moisture in the meter and will then be unable to perform their functions properly. It is also of advantage to have clutches which will not be affected by tilting the meters or turning them upside down. In the preferred arrangement which I have illustrated, the wheels $p^1$ and $q^1$ are made loose on their shafts, and fixed to the shaft directly above them are ratchet wheels, S and $S^1$, respectively.

T and $T^1$ are pawls carried respectively upon the gear wheels $p^1$ and $q^1$ in position to engage with the adjacent ratchet wheels. The pawls and ratchets in the two trains are of course reversely arranged so that when the driving shaft is traveling in either direction and one pawl and ratchet is operative the other is idle. The pawls and ratchets are preferably made like escapements so that each pawl will be forced positively into engagement with one of the teeth of its ratchet wheel when it is carried in the proper direction by its supporting gear wheel.

Referring to Fig. 4, it will be seen that a rotation of the shaft O which causes the gear wheels $p^1$ and $q^1$ to revolve in the clockwise direction will result: in causing gear wheel $p^1$ to be clutched to shaft P through the nose $t$ on one end of the pawl T and one of the teeth of ratchet wheel S. At the same time the corresponding end $t^1$ of the pawl $T^1$ will ride over the teeth of the ratchet whel $S^1$, leaving the gear wheel $q^1$ free to revolve upon its shaft and rendering that train inoperative. It will be seen that as the nose $t^1$ rises along one of the teeth of the ratchet wheel $S^1$, the opposite end of the pawl, $t^2$, will be depressed into the path of another tooth so that, if the direction of rotation of the driving shaft be reversed, either the nose $t^1$ or the end $t^2$ of the pawl $T^1$ will engage with a tooth of the ratchet wheel $S^1$ and clutch the gear wheel $q^1$ to its shaft. During such a movement, however, the pawl T will ride idly over its coöperating ratchet wheel and the train which was previously active will now be idle. It will be seen that the action of the clutching mechanism is positive and not affected by the position which the meter may be occupying. If desired the two trains may be arranged so that they will drive the registering or indicator mechanism at different rates of speed for a given speed of the drivng shaft. Therefore, when the meter is properly connected, it will register properly; while, upon reversing the connection, the meter will register too rapidly, causing a loss to the consumer instead of to the vender.

While I have described in detail the best form of my invention known to me I do not desire to be limited to the particular form except as expressly indicated by the terms of the definitions of my invention constituting the appended claims.

Having now fully described my invention what I claim as new and desire to secure by Letters Patent is:

1. In a gearing for meters, a driving pinion, two driven shafts, gear wheels revolubly supported on said shaft and meshing with said pinion, oppositely arranged ratchet wheels fixed to said shafts in proximity to said gear wheels, and pawls carried by the gear wheels and coöperating with said ratchet wheels.

2. In a meter, a driving member, a driven member, two trains of gearing between said driving member and said driven member, a ratchet wheel secured to one of the elements of each train, and a pawl connected to a second element of each train and coöperating with the ratchet wheel in that train, said ratchet wheels being oppositely arranged in the two trains so that each train is operative during movement of the driving member in one direction only, said trains being so proportioned that they actuate the driven member in the same direction but at different rates of speeds when the driving member is actuated in opposite directions at the same rate of speed.

3. In a meter, a driving member, a driven member, two trains of gearing between said members, one of said trains being arranged to actuate said driven member in a predeterminated direction when the driving member moves in one direction and the other of said trains being arranged to actuate the driven member in the said predetermined direction when the driving member is moved in the opposite direction, each of said trains including a clutch for rendering that train inoperative when the driven member is being actuated through the other train, and said trains being so proportioned that they actuate the driven member at different rates of speed for a given rate of speed of the driving member.

In testimony whereof, I sign this specification in the presence of two witnesses.

AUGUSTUS F. HINTZE.

Witnesses:
WM. F. FREUDENREICH,
HARRY S. GAITHER.